(12) United States Patent
Yamada

(10) Patent No.: US 11,050,899 B2
(45) Date of Patent: Jun. 29, 2021

(54) IMAGE FORMATION APPARATUS, CONTROL METHOD THEREFOR, AND STORAGE MEDIUM

(71) Applicant: CANON KABUSHIKI KAISHA, Tokyo (JP)

(72) Inventor: Tetsuya Yamada, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/741,582

(22) Filed: Jan. 13, 2020

(65) Prior Publication Data

US 2020/0236245 A1 Jul. 23, 2020

(30) Foreign Application Priority Data

Jan. 18, 2019 (JP) .............................. JP2019-007007

(51) Int. Cl.
*H04N 1/00* (2006.01)
*H04N 1/44* (2006.01)

(52) U.S. Cl.
CPC ..... *H04N 1/00962* (2013.01); *H04N 1/00339* (2013.01); *H04N 1/4413* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2010/0050247 A1* | 2/2010 | Hashimoto | ........... | G06F 21/335 726/10 |
| 2011/0078789 A1* | 3/2011 | Kamasuka | ............ | G06F 21/608 726/20 |
| 2018/0322501 A1* | 11/2018 | Eisen | ..................... | G06Q 20/34 |

FOREIGN PATENT DOCUMENTS

JP 2011-073343 A 4/2011

* cited by examiner

*Primary Examiner* — Frantz Bataille
(74) *Attorney, Agent, or Firm* — Canon U.S.A., Inc. IP Division

(57) ABSTRACT

In a case where a driver for a system authentication application preinstalled in an image formation apparatus is active, a display unit displays a screen such that issuance of an instruction to perform authentication based on an authentication method using an IC card is performable. In a case where a driver for a general authentication application installed in the image formation apparatus in accordance with an instruction from a user is active, the display unit displays the screen such that issuance of an instruction to perform authentication based on the authentication method using the IC card is not performable.

9 Claims, 13 Drawing Sheets

FIG.9A

■ ENTER USER NAME AND PASSWORD

USER NAME: [　　　　　]

PASSWORD: [　　　　　]

[ LOG IN ]

FIG.9B

HOLD IC CARD OVER CARD READER

FIG.9C

■ ENTER USER NAME AND PASSWORD OR HOLD IC CARD OVER CARD READER TO LOG IN

USER NAME: [　　　　　]

PASSWORD: [　　　　　]

[ LOG IN ]

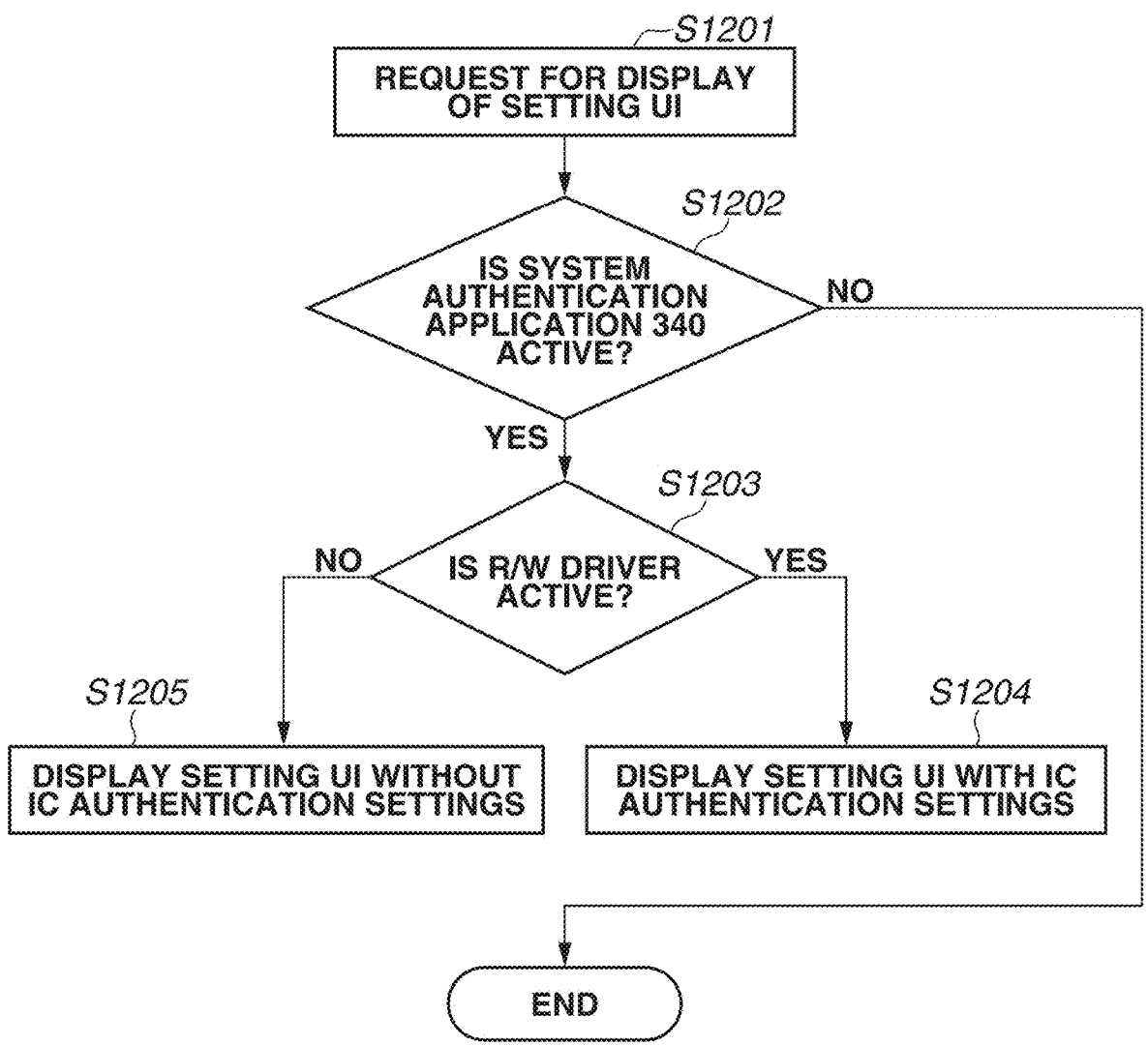

IMAGE FORMATION APPARATUS, CONTROL METHOD THEREFOR, AND STORAGE MEDIUM

BACKGROUND

Field of the Disclosure

The present disclosure relates to an image formation apparatus that performs user authentication by using an externally connected reading apparatus, a control method for the image formation apparatus, and a storage medium.

Description of the Related Art

Some known multi-function peripherals (MFPs) include image reading units, print units, and communication units, and include image processing applications for copying, printing, transmitting scanned images, etc. Not only these MFPs but information apparatuses, such as smartphones, have a mechanism that allows their users to additionally install general applications after purchasing the information apparatuses. Providers of these MFPs and the operating systems (OSs) of these smartphones provide a software development kit (SDK) that allows third persons to develop general applications, and application programing interfaces (APIs) are installed in the information apparatuses to allow the general applications to use the functions of the information apparatuses.

There is also an MFP that can be used by a plurality of users and that includes a user authentication function so that restriction of usable functions and personalization per authenticated user can be made. It is often the case that this kind of MFP includes, as a standard function, keyboard authentication in which a user enters a user name and a password by using a soft keyboard on a control panel. The MFP can also perform integrated circuit (IC) card authentication in which the MFP performs authentication of an individual by the individual holding their IC card, which has been distributed as their employee identification card, over a card reader. The MFP can also performs biometric authentication in which the MFP performs authentication of an individual by reading their biometric information, such as finger vein information. There are cases where these authentications need reading apparatuses connectable via a universal serial bus (USB) separately from the MFP. These reading apparatuses are often provided as optional products as discussed in Japanese Patent Application Laid-Open No. 2011-073343.

In the USB, devices are grouped into specification groups called device classes based on functions of the devices connected (for example, a USB memory belongs to a class called a mass storage class), and an individual device can be controlled by a common device driver and application called a class driver. However, since the above reading apparatuses need their unique control processing, dedicated drivers are needed together with the reading apparatuses.

SUMMARY

According to an aspect of some embodiments, an image formation apparatus to which a reading apparatus that reads an IC card is connectable and which includes an authentication application that performs authentication of a user by acquiring authentication information stored in the IC card and read by the reading apparatus includes a management unit configured to operate a driver that controls the reading apparatus, and a display unit configured to display a screen for specifying an authentication method. In a case where a driver for a system authentication application preinstalled in the image formation apparatus is active, the display unit displays the screen such that issuance of an instruction to perform authentication based on an authentication method using the IC card is performable. In a case where a driver for a general authentication application installed in the image formation apparatus in accordance with an instruction from the user is active, the display unit displays the screen such that issuance of an instruction to perform authentication based on the authentication method using the IC card is not performable.

Further features of various embodiments will become apparent from the following description of exemplary embodiments with reference to the attached drawings.

BRIEF DESCRIPTION OF THE DRAWINGS

FIGS. 9A, 9B, and 9C illustrate examples of an authentication screen provided by a system authentication application.

FIG. 12 is a flowchart illustrating control processing for displaying an authentication setting UI by an authentication setting unit.

DESCRIPTION OF THE EMBODIMENTS

Some multi-function peripherals (MFPs) capable of providing a plurality of authentication methods by using a reading apparatus that reads an integrated circuit (IC) card provide a setting screen for a user to select an authentication method. However, displaying of the same setting screen consistently regardless of the optional device mounted or the authentication method may be inconvenient for a user. Specifically, it is inconvenient for a user that, in spite of the user having installed a desired authentication application in the MFP, a setting of an IC card authentication related to an authentication application not desired by the user can be made.

Thus, some embodiments are directed to performing control so that a setting of IC card authentication related to an authentication application not desired by the user cannot be made.

Hereinafter, an exemplary embodiment will be described in detail with reference to the accompanying drawings. The following exemplary embodiment does not limit the claims. In addition, all the combinations of the features described in the exemplary embodiment are not necessarily essential to every embodiment.

A first exemplary embodiment will be described.

<<System Configuration>>

Figure 1:
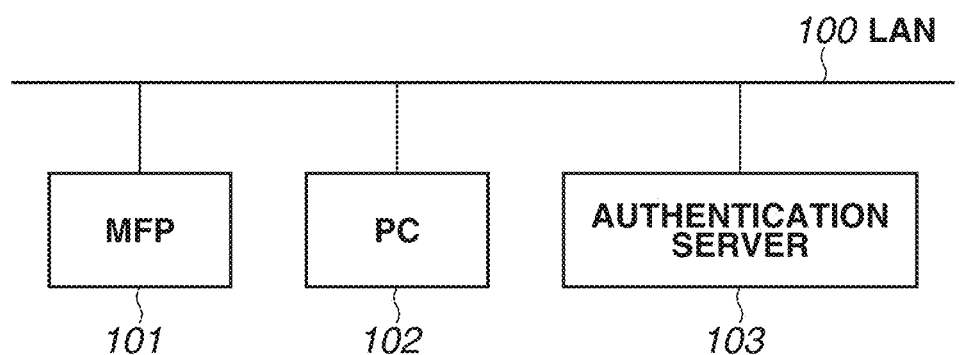
FIG. 1 illustrates a system configuration related to a multi-function peripheral (MFP).

FIG. 1 is an overall view of a system related to an MFP 101, which is an image formation apparatus. Apparatuses described below are connected to a local area network (LAN) 100. A personal computer (PC) 102 transmits a print job to the MFP 101 and displays and operates a web user interface (UI) provided by the MFP 101 on a web browser. An authentication server 103 manages a user who can use the MFP 101 and performs authentication and matching of the user in response to a query from the MFP 101.

<<Hardware Configuration>>

Figure 2:
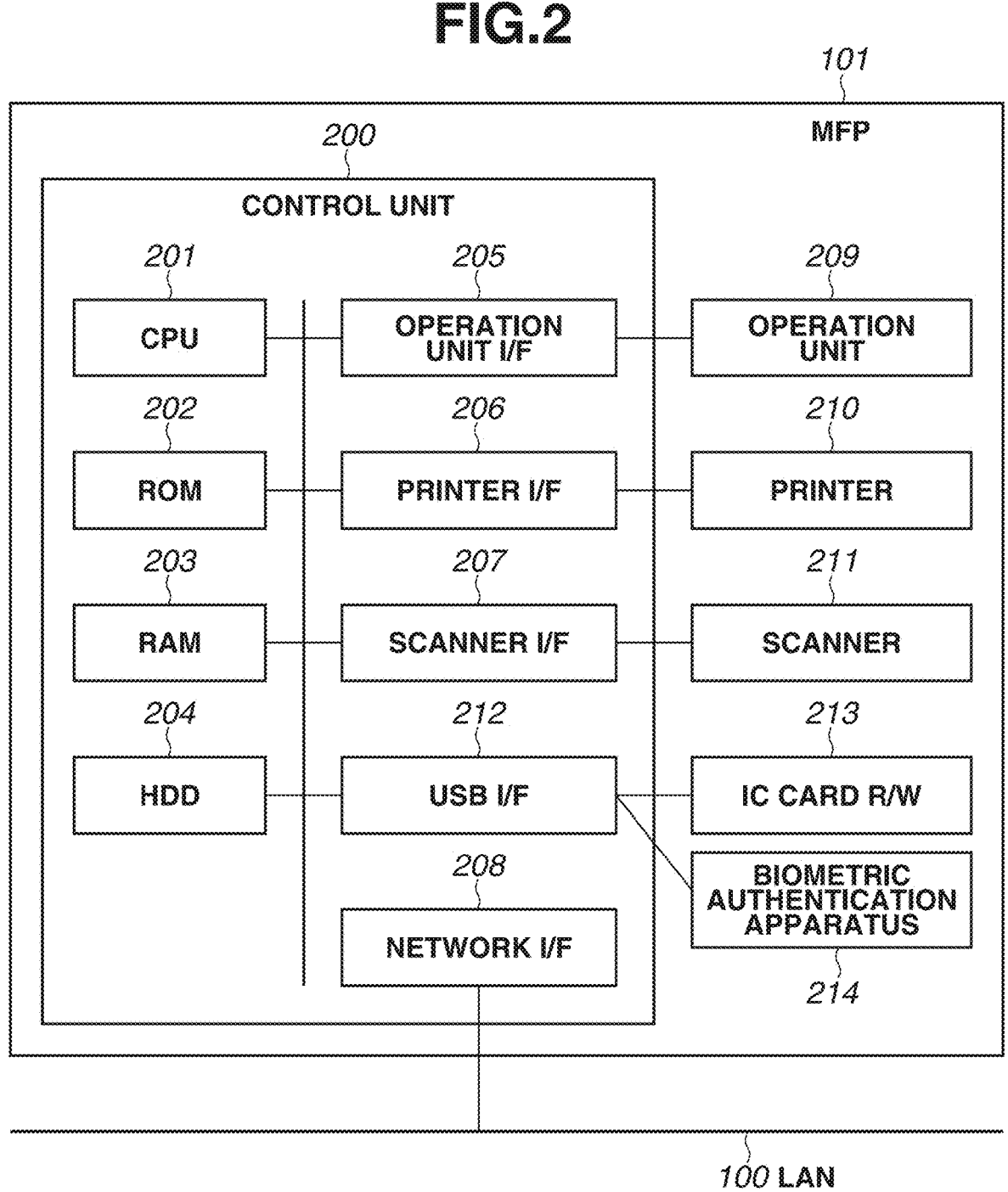
FIG. 2 is a block diagram illustrating a hardware configuration of the MFP.

FIG. 2 is a hardware block diagram illustrating a configuration of the MFP 101. A control unit 200, including a central processing unit (CPU) 201, controls an overall operation of the MFP 101. The CPU 201 reads out a control program stored in a read-only memory (ROM) 202 and performs various types of control processing, such as reading and transmitting. A random access memory (RAM) 203 is used as a main memory of the CPU 201 and a temporary storage area, such as a work area.

A hard disk drive (HDD) 204 holds image data and various programs. An operation unit interface (I/F) 205 connects an operation unit 209 to the control unit 200. A printer I/F 206 connects a printer 210 to the control unit 200. Printing target image data is transferred from the control unit 200 via the printer I/F 206 and is printed on a recording medium by the printer 210. A scanner I/F 207 connects a scanner 211 to the control unit 200. The scanner 211 generates image data by reading an image on a document and inputs the image data to the control unit 200 via the scanner I/F 207.

A network I/F 208 connects the control unit 200 (the MFP 101) to the LAN 100. The network I/F 208 exchanges various types of information with an external apparatus on the LAN 100 (e.g., receiving a print job from the PC 102). A universal serial bus (USB) I/F 212 connects a USB device to the control unit 200. For example, the USB device may be one which a customer who purchases the MFP 101 may purchase as an optional device if the customer wishes to have an additional function. An IC card reader/writer (R/W) 213, a biometric authentication apparatus 214, etc. are connectable as components to be used for the user authentication function according to the present exemplary embodiment. The present exemplary embodiment will be described based on a case where the IC card R/W 213 is connected. Of course, the biometric authentication apparatus 214 may be connected as well.

<<Software Configuration>>

Figure 3A:
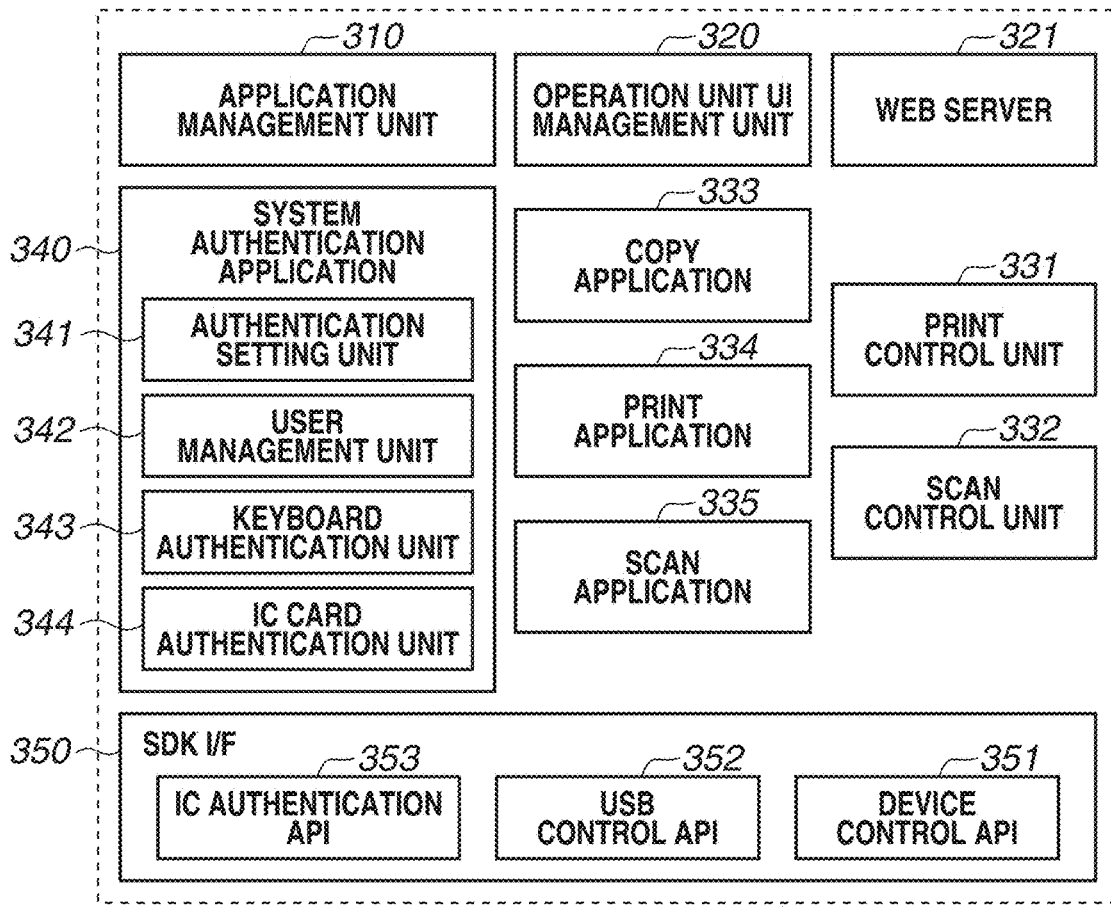
FIG. 3A is a block diagram illustrating a software configuration of the MFP.

FIG. 3A is a block diagram illustrating a software configuration of the MFP 101 according to the present exemplary embodiment. A print control unit 331 controls the printer 210 via the printer I/F 206 in response to an instruction from an application. A scan control unit 332 controls the scanner 211 via the scanner I/F 207 in response to an instruction from an application.

Several applications are installed as a part of the firmware of the MFP 101 at the time of shipment. Such applications are called "system applications". In addition, the user can install applications on the MFP 101 after shipment. The applications installed by the user are called "general applications". In addition, there are applications called "authentication applications". An operation unit UI management unit 320 displays an authentication screen provided by an activated authentication application on the operation unit 209 and performs control processing such that the user cannot use the functions of the MFP 101 until the user is authenticated. Thus, the operation unit UI management unit 320 performs control processing such that always a single authentication application is activated while the MFP 101 is active.

The system applications, such as a copy application 333, a print application 334, and a scan application 335, are installed in the MFP 101. The copy application 333 provides a copying function by using the print control unit 331 and the scan control unit 332. The print application 334 retains print jobs input from the PC 102, displays a list of print jobs input by a user who has logged in, prompts the user to check the contents of the list, and performs printing by using the print control unit 331. The scan application 335 transmits an image scanned by using the scan control unit 332 to the outside by email or the like. A system authentication application 340 is also a preinstalled authentication application, as in the system applications. The system applications and the system authentication application 340 are not the ones that are added by instructions from the user but the ones that are already installed on the MFP 101.

Figure 4:
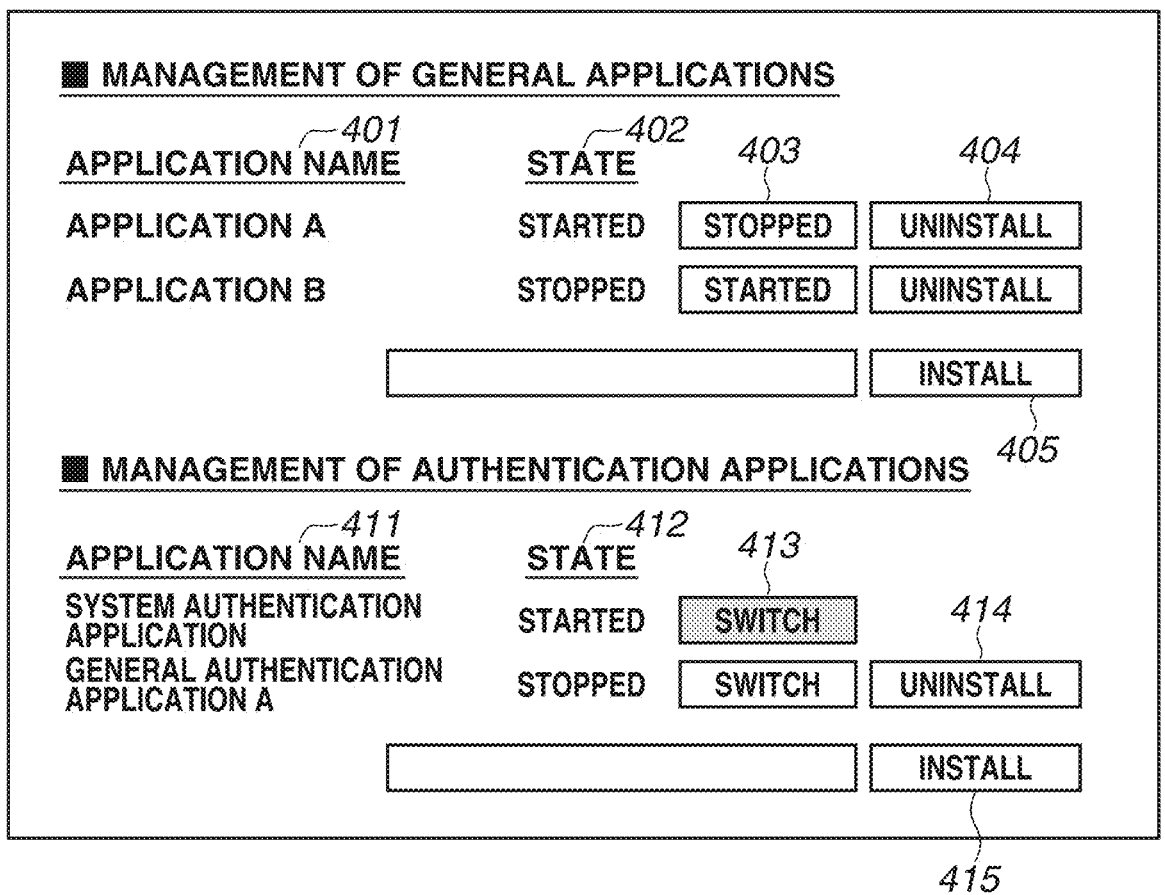
FIG. 4 illustrates an example of a management user interface (UI) provided by an application management unit.

An application management unit 310 provides, as a web UI, a UI for displaying information about the general applications and the authentication applications, managing the states of these applications, and installing and uninstalling these applications. FIG. 4 illustrates a display example of a management screen for managing the applications. This management screen indicates that two general applications "application A" and "application B" are installed. A column 402 indicates the states of the applications. Specifically, the column 402 indicates that the application A is in a started state and the application B is in a stopped state. The applications A and B are the applications that have been installed in accordance with instructions from the user and are different from the system applications. The user can switch the active state and the inactive state by pressing a button in a column 403. In addition, the user can uninstall an application by pressing an "uninstall" button in a column 404. The user can install an application by entering a file path and pressing an "install" button in a line 405.

For the authentication applications, while a "general authentication application A" has been installed by the user, the states of the authentication applications in a column 412 indicate that the preinstalled "system authentication application" is in the started state. If the user presses a "switch" button in a column 413, the state of the authentication application in the corresponding line can be switched to the started state. However, the "switch" button corresponding to the authentication application in the started state is grayed out and cannot be pressed. As a result, a situation where all the authentication applications are in an inactive state is avoided. The user can install an application by entering a file path and pressing an "install" button in a line 415. Since any one of the authentication applications is always maintained active, either the system authentication application or the general authentication application is always in a started state.

Figure 5:
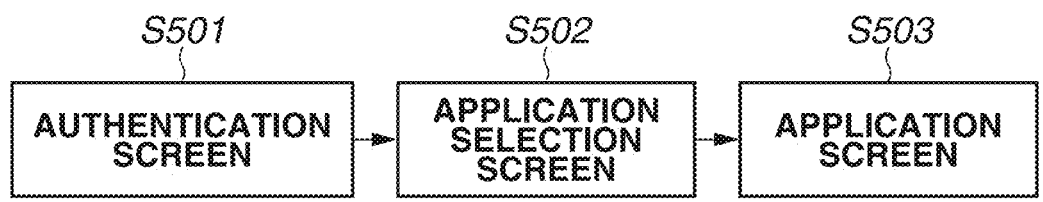
FIG. 5 illustrates an example of screen transition controlled by an operation unit UI management unit.

The operation unit UI management unit 320 manages applications to be displayed on the operation unit 209. For example, the operation unit UI management unit 320 performs control processing such as screen transition illustrated in FIG. 5. In S501, the operation unit UI management unit 320 displays an authentication screen by passing control authority to the authentication application at startup. If the user has been successfully authenticated and the display authority has been returned to the operation unit UI management unit 320, the operation unit UI management unit 320 displays an application selection screen in S502.

Figure 6:
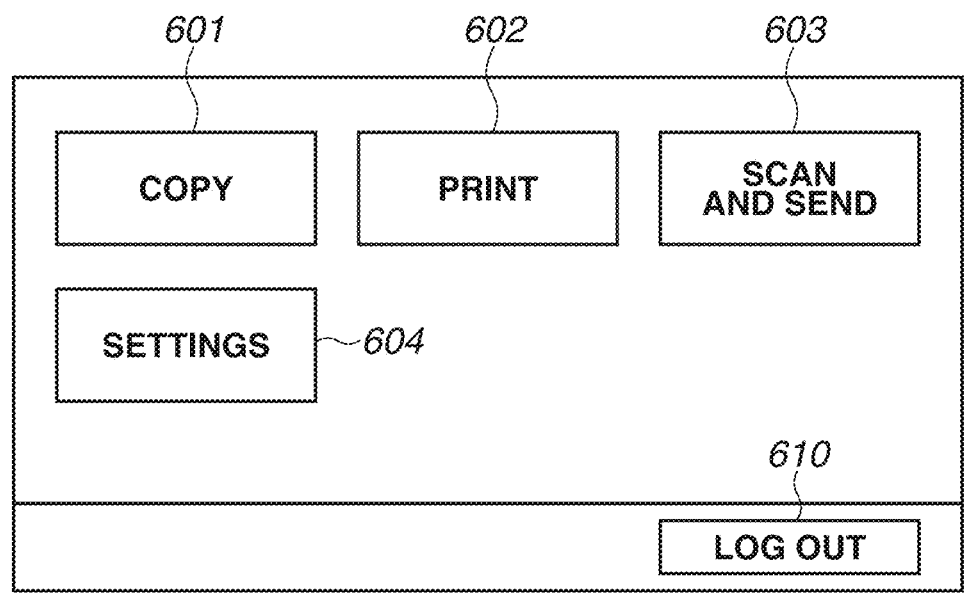
FIG. 6 illustrates an example of an application selection screen provided by the operation unit UI management unit.

FIG. 6 illustrates a display example of the application selection screen. In S503, if the user presses a "copy" button 601, the control authority is passed to the copy application 333. If the user presses a "print" button 602, the control authority is passed to the print application 334. If the user presses a "scan and send" button 603, the control authority is passed to the scan application 335. If the user presses a "settings" button 604, a setting menu related to the MFP 101, the menu including settings of all the system applications, is provided. If the user presses a "log out" button 610, the operation unit UI management unit 320 displays the authentication screen again.

Figure 7:
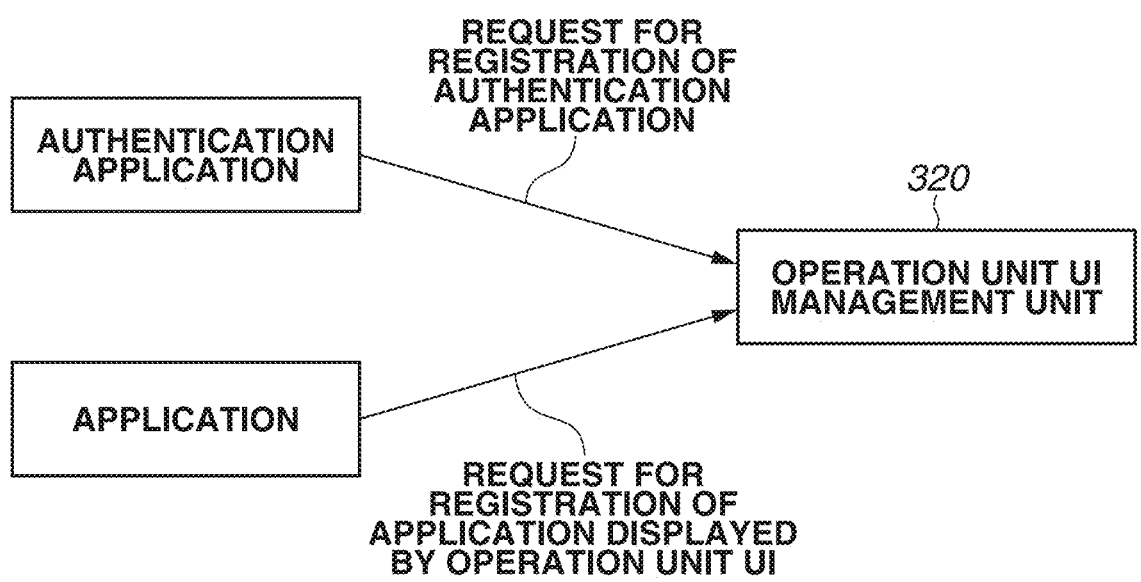
FIG. 7 illustrates processing for registration into the operation unit UI management unit which is performed by applications at startup of the MFP.

When the MFP 101 is started, processing as illustrated in FIG. 7 is performed. Thus, the operation unit UI management unit 320 grasps which applications are to be managed. When started, an authentication application in the started state sends a request that information indicating that this authentication application is the active authentication application is registered by the operation unit UI management unit 320. Next, among the system applications and the general applications, the application that provides a UI operation on the operation unit 209 sends a request that this application is registered by the operation unit UI management unit 320. The application selection screen in FIG. 6 displays the applications that have made such registration requests.

Figure 8:
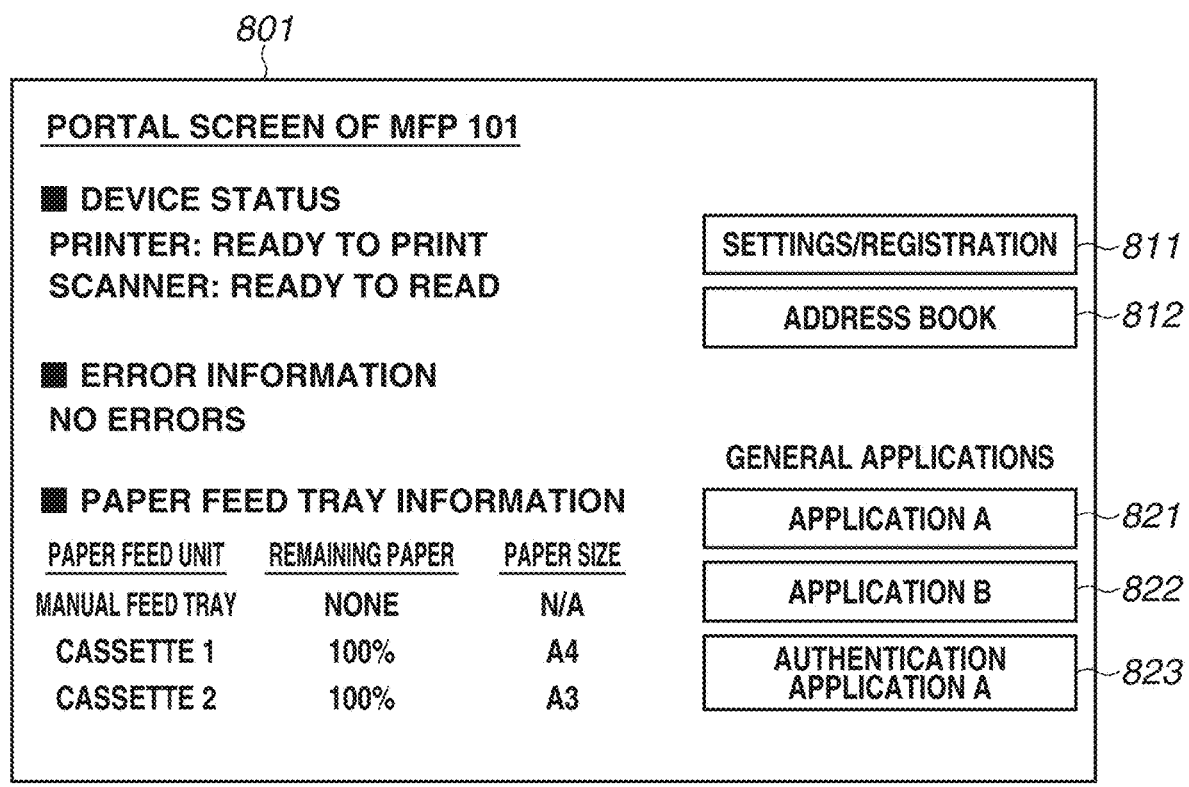
FIG. 8 illustrates an example of a portal screen provided by a web server.

A web server 321 receives a request to provide a web UI from the PC 102 and sends the request to provide the web UI to the application requested. When the application that provides the web UI is started, the application performs processing for registering this provision in the web server 321. FIG. 8 illustrates a display example of a portal screen provided by the web server 321. The state of the MFP 101 is displayed in an area 801. If the user presses a "settings/registration" button 811, the screen transitions to the web UI for settings related to the MFP 101, the settings including those related to the system applications. The web UI for the settings includes a plurality of screens including a menu screen, which is the entrance UI. The menu screen transition to various setting screens. If the user presses an "address book" button 812, the screen transitions to a web UI for setting a transmission destination used by the scan application 335. If the user presses any one of buttons 821 to 823, the screen transitions to a web UI provided by a corresponding one of the above applications registered in the web server 321. Settings related to the general applications are provided in the web UIs provided by the respective general applications after the screen transitions thereto.

A software development (SDK) OF 350 is an API that allows a general application to use functions of the MFP 101 and coordinates the functions. For example, by using a device control API 351, a general application can control the printer 210 and the scanner 211 via the print control unit 331, the scan control unit 332, etc.

The system authentication application 340 provides two authentication methods, which are keyboard authentication and IC card authentication. FIG. 9A is a display example of an authentication screen when only the keyboard authentication is enabled as the authentication method. FIG. 9B is a display example of an authentication screen when only the IC card authentication is enabled. FIG. 9C is a display example of an authentication screen when the keyboard authentication and the IC card authentication are both enabled. The keyboard authentication screen in FIG. 9C displays a message indicating that the user may be authenticated by holding his/her IC card over the card reader.

An authentication setting unit 341 manages selection of an authentication method, detailed settings per authentication method, etc. and provides an UI for making the settings. The UI can be displayed through the entrance to the settings of the MFP 101, such as through a "setting" button 604 on the application selection screen in FIG. 6 and the "settings/registration" button 811 on the portal screen of the web UI in FIG. 8.

A user management unit 342 manages users who can use the MFP 101. A keyboard authentication unit 343 provides the authentication screen on which a user name and a password are entered as the authentication information and verifies the entered authentication information against an authentication destination designated by the authentication setting unit 341.

Figure 3B:
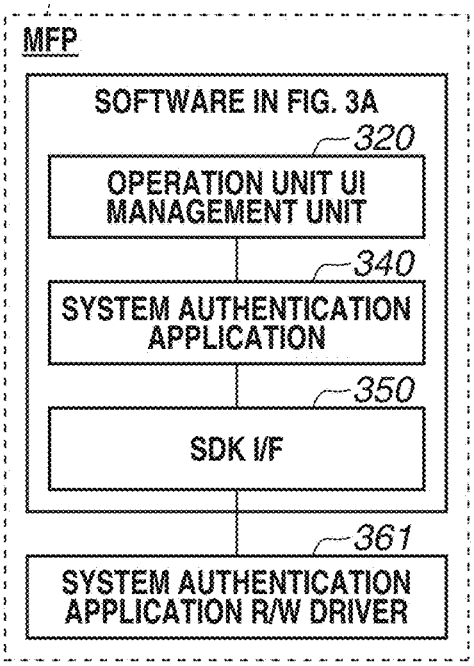
FIG. 3B is a block diagram illustrating a software configuration when an integrated circuit (IC) card authentication unit is active.
Figure 10:
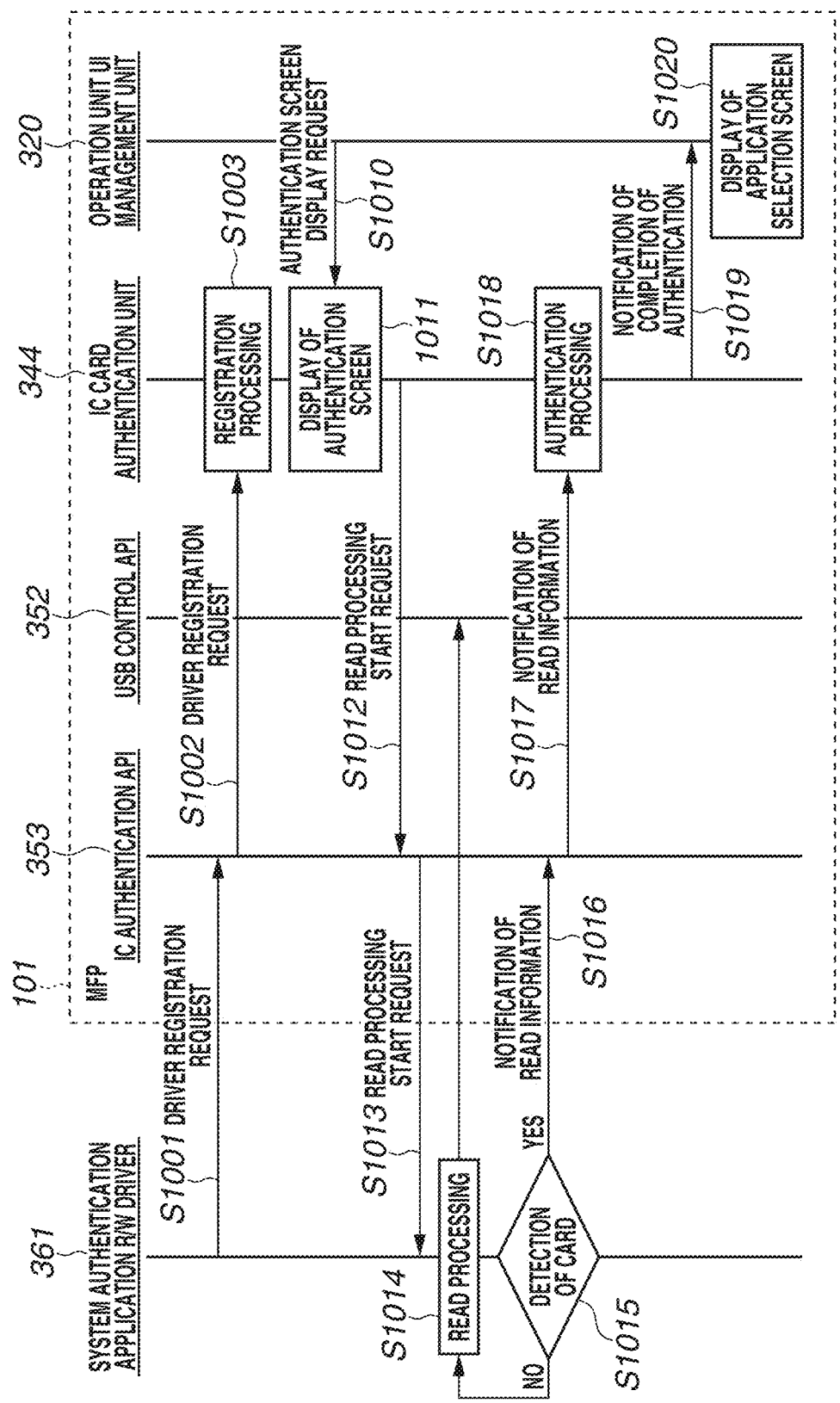
FIG. 10 illustrates a sequence that realizes IC card authentication when the system authentication application is active.

An IC card authentication unit 344 performs authentication processing by using information in an IC card read by the IC card R/W 213 as the authentication information. Since the IC card R/W 213 is installed as an optional device of the MFP 101, driver software for controlling the IC card R/W 213 is installed as a general application. As illustrated in FIG. 3B, the system authentication application 340 registered by the operation unit UI management unit 320 as an active authentication application coordinates with the installed driver (a system authentication application R/W driver 361 in this case), to realize the functions of the card R/W in the IC card authentication. A specific sequence will be described with reference to FIG. 10.

In S1001, when the MFP 101 is started, the system authentication application R/W driver 361 requests an IC authentication API 353 to register the system authentication application R/W driver 361 as an IC card authentication R/W driver. In S1002, the IC authentication API 353 transfers the registration request to the IC card authentication unit 344. In S1003, the IC card authentication unit 344 performs driver registration processing, and the processing which is performed at the startup of the MFP 101 is ended.

In S1010, the IC card authentication unit 344 receives a request for displaying the authentication screen from the operation unit UI management unit 320. In S1011, the IC card authentication unit 344 displays the authentication screen. In the S1012, the IC card authentication unit 344 requests the IC authentication API 353 to start card reading processing by using the IC card R/W. In S1013, the IC authentication API 353 transfers the request to the system authentication application R/W driver 361. In S1014, when the system authentication application R/W driver 361 receives the request, the system authentication application R/W driver 361 instructs, via a USB control API 352, the IC card R/W to detect the IC card by sending electric waves every several tens of microseconds to the IC card.

In S1015, when the system authentication application R/W driver 361 detects the IC card, the system authentication application R/W driver 361 reads the authentication information in the IC card. In S1016, the system authentication application R/W driver 361 notifies the IC authentication API 353 of the read authentication information. In S1017, the IC authentication API 353 transfers the authentication information to the IC card authentication unit 344. In S1018, the IC card authentication unit 344 performs authentication processing based on the received authentication information. If the authentication is successful, the IC card authentication unit 344 notifies the operation unit UI management unit 320 of the completion of the authentication processing. In S1020, the operation unit UI management unit 320 that has received the notification displays the application selection screen.

<<General Authentication Application>>

Figure 3C:
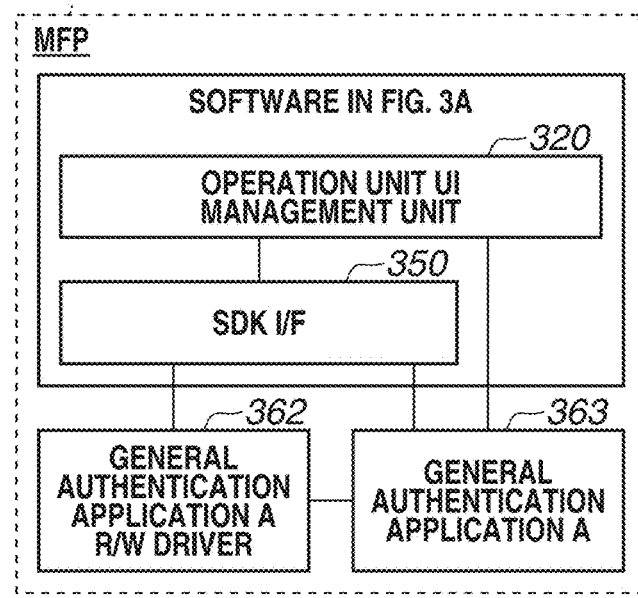
FIG. 3C is a block diagram illustrating a software configuration when a general authentication application is active.
Figure 11:
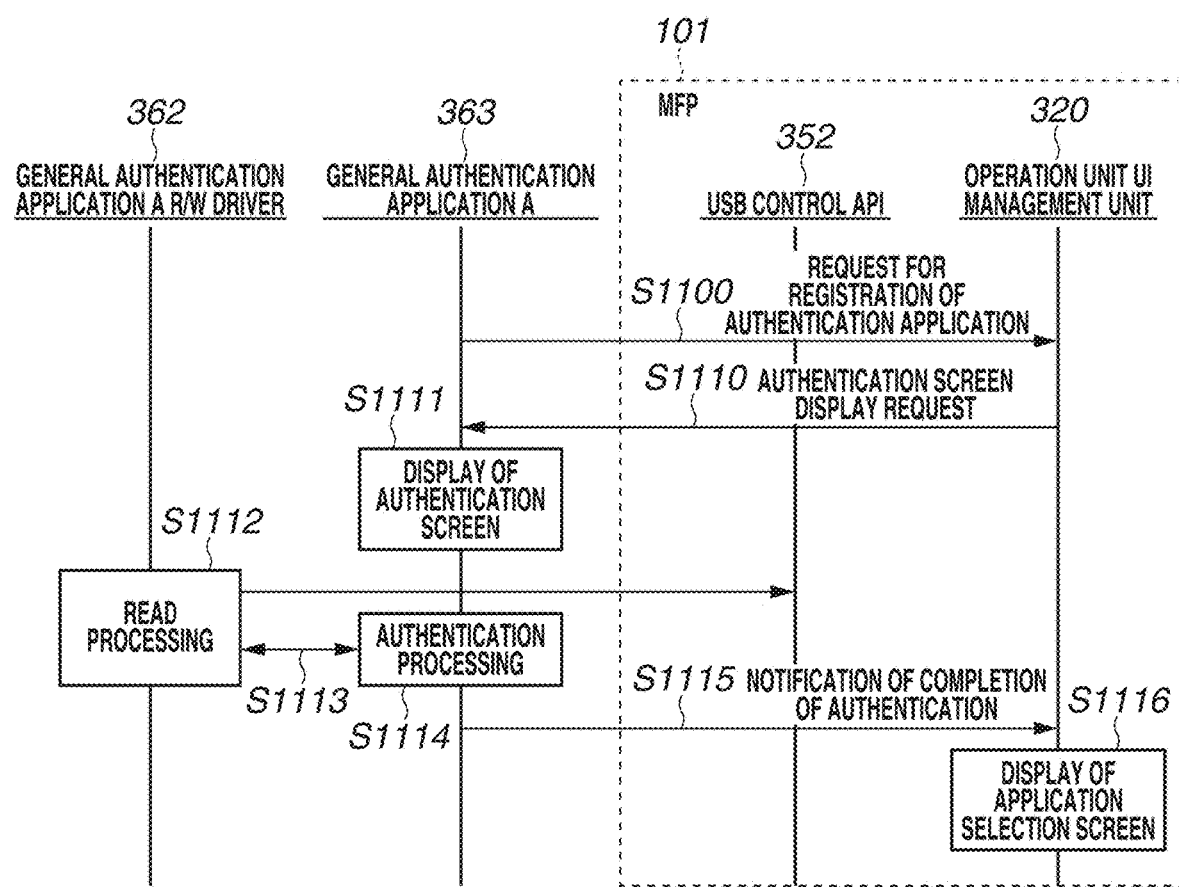
FIG. 11 illustrates a sequence that realizes IC card authentication when a general authentication application is active.

In a case where a general authentication application installed after purchase of the MFP 101 is active, as illustrated in FIG. 3C, a general authentication application A 363 and a general authentication application R/W driver 362 are installed. A specific sequence will be described with reference to FIG. 11.

In S1100, the general authentication application A 363 requests the operation unit UI management unit 320 to register the general authentication application A 363 as the active authentication application at startup. In S1110, the operation unit UI management unit 320 requests the general authentication application A 363 to display an authentication screen. In S1111, the general authentication application A 363 displays the authentication screen. In S1112, the general authentication application A R/W driver 362 controls the IC card R/W 213 via the USB control API 352 and reads information in an IC card. In S1114, the general authentication application A 363 acquires the read information and performs authentication processing.

The interaction between the general authentication application A R/W driver 362 and the general authentication application A 363 in S1113 prior to the authentication processing in S1114 may be performed by a unique processing method irrespective of the SDK I/F 350 of the MFP 101. In S1115, the general authentication application A 363 notifies the operation unit UI management unit 320 of the completion of the authentication processing. Next, in S1116, the operation unit UI management unit 320 displays the application selection screen. In this way, the IC card authentication is performed without processing of the IC authentication API 353 and the IC card authentication unit 344.

<<Display of Authentication Setting UI>>

As described above, if the user presses the "setting" button 604 in FIG. 6, the setting menu in FIG. 8 is displayed. If the user presses the "settings/registration" button 811 in FIG. 8, a setting menu is also displayed. While these setting menus have different UIs, the user can set the same setting items in each of the setting menus. If the user selects an authentication-related menu item (not illustrated) in any of the setting menus, the authentication setting unit 341 provides a setting UI regarding the system authentication application 340. The control processing performed by the authentication setting unit 341 will be described with reference to a flowchart in FIG. 12, assuming that the UI is a web UI.

In S1201, the user enters a request for display of an authentication setting UI. In S1202, whether or not the system authentication application 340 is active in the management of authentication applications (see FIG. 4) performed by the application management unit 310 is checked. If the system authentication application 340 is not active (NO in S1202) (namely, "the general authentication application A", which is a general application, is active), the processing illustrated in the flowchart in FIG. 12 ends. Specifically, a button for displaying a setting UI for authentication settings of the "authentication application A" in FIG. 8 is displayed as described above. Since the authentication settings of the "authentication application A" is performed by the setting UI of the "authentication application A", the present processing ends.

Figure 13A:
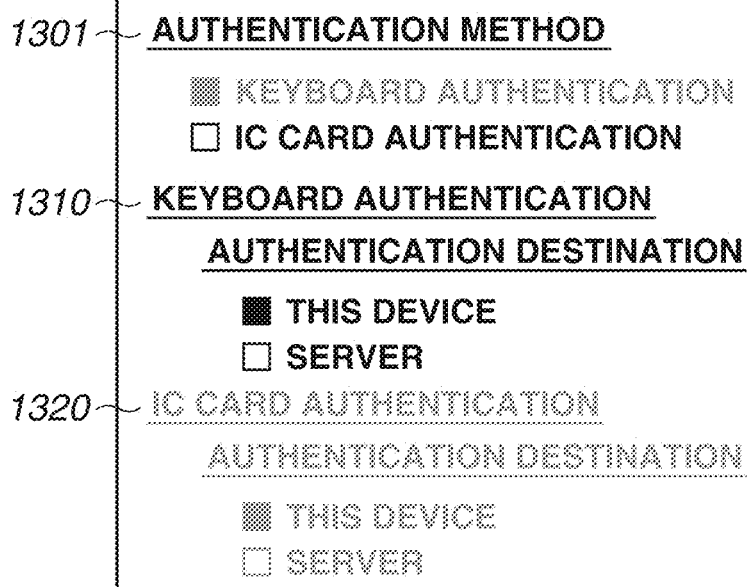
FIGS. 13A and 13B illustrate examples of the authentication setting UI.
Figure 13B:
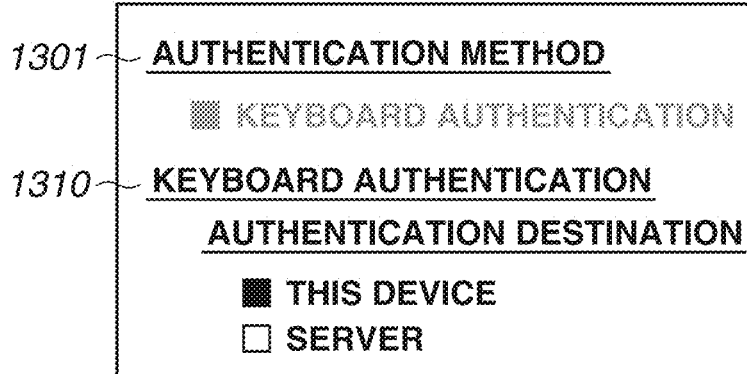

In S1202, if the system authentication application 340 is active (YES in S1202), the processing proceeds to S1203. In S1203, whether or not the system authentication application R/W driver 361 is active is determined. One specific example of the determination method is to determine whether the system authentication application R/W driver 361 is in the started state in the application management unit 310. Another method is to determine whether the IC card authentication unit 344 has performed the registration processing in S1003 in the sequence illustrated in FIG. 10. In S1203, if the determination result indicates that the system authentication application R/W driver 361 is active (YES in S1203), the processing proceeds to S1204. In S1204, an authentication setting UI as illustrated in FIG. 13A is displayed. In S1203, if the determination result indicates that the system authentication application R/W driver 361 is not active (NO in S1203), the processing proceeds to S1205. In S1205, an authentication setting UI as illustrated in FIG. 13B is displayed. Alternatively, it may be determined that the system authentication application R/W driver 361 is active on conditions that the system authentication application R/W driver 361 is in the started state and that the registration processing has been performed. In the present exemplary embodiment, whether or not the system authentication application R/W driver 361 is active is determined as a necessary condition. However, for example, only whether or not the general authentication application A is active may be set as the determination condition.

The setting UI for the system authentication application 340 includes a section 1301 for selecting an authentication method and sections for making detailed settings of the individual authentication methods (a section 1310 for keyboard authentication and a section 1320 for IC card authentication). In FIG. 13A, which is displayed when the system authentication application R/W driver 361 is active, a UI is provided in which the IC card authentication is selectable as the authentication method in the section 1301. In contrast, in FIG. 13B, the UI in which the IC card authentication is selectable is not provided.

In addition, while detailed settings related to the IC card authentication in the section 1320 is provided in the setting UI in FIG. 13A, the setting UI in FIG. 13B does not. In FIG. 13B, any settings related to the IC card authentication is not displayed. However, a control may be performed so that the setting UI in FIG. 13B displays the settings related to the IC card authentication that are set as uneditable.

As described above, one of the authentication methods needs to be enabled. In FIG. 13A, since the IC card authentication is not selected in the section 1301, a control is performed so that the keyboard authentication is automatically set as enabled and uneditable. In addition, in FIG. 13B, the keyboard authentication in the section 1301 is also automatically grayed out to be set as uneditable. In this way, a situation where there is no authentication method available can be prevented.

As described above, the exemplary embodiments enable control so that a setting of IC card authentication related to an authentication application not desired by the user cannot be made.

Other Embodiments

Some embodiments can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2019-007007, which was filed on Jan. 18, 2019 and which is hereby incorporated by reference herein in its entirety.

What is claimed is:

1. An image formation apparatus to which a reading apparatus that reads an IC card is connectable and which includes an authentication application that performs authentication of a user by acquiring authentication information stored in the IC card and read by the reading apparatus, the image formation apparatus comprising:
   at least one processor and at least one memory in communication with the at least the processor and having instructions stored thereon that, when executed by the at least the processor, cause the at least one processor and the least one memory to cooperate to act as:
   a management unit configured to operate a driver that controls the reading apparatus; and
   a display unit configured to display an authentication method setting screen that receives an instruction for setting one authentication method to be used for the image formation apparatus from among a plurality of authentication methods including at least a first authentication method using a keyboard and a second authentication method using the IC card,
   wherein, in a case where a driver for a system authentication application preinstalled in the image formation apparatus is active, the display unit displays the authentication method setting screen, and
   wherein, in a case where the system authentication application is not active and a driver for a general authentication application installed in the image formation apparatus in accordance with an instruction from the user is active instead, the display unit displays the authentication method setting screen in which a display form thereof is changed such that an instruction to set the second authentication method using the IC card by the system authentication application cannot be received as an authentication method to be used for the image formation apparatus.

2. The image formation apparatus according to claim 1, wherein the at least one processor and the least one memory further cooperate to act as:
   a registration unit configured to register the driver for the system authentication application,
   wherein, in a case where the driver for the system authentication application is registered by the registration unit, the display unit displays the authentication method setting screen such that issuance of an instruction to perform authentication based on the second authentication method using the IC card is performable.

3. The image formation apparatus according to claim 2, wherein, in a case where the driver for the system authentication application is registered by the registration unit, the display unit displays the authentication method setting screen such that making a detailed setting of the second authentication method using the IC card is performable.

4. The image formation apparatus according to claim 1, wherein, in a case where the system authentication application is active, the display unit displays the authentication method setting screen such that issuance of an instruction to perform authentication based on the second authentication method using the IC card is performable.

5. The image formation apparatus according to claim 1, wherein the authentication method setting screen is a first screen for an authentication setting of the system authentication application and is different from a second screen for an authentication setting of the general authentication application.

6. The image formation apparatus according to claim 1, wherein the first authentication method using the keyboard is automatically selected and enabled in a case where an instruction to select the second authentication method using the IC card and to perform authentication of a user based on the second authentication method using the IC card is not issued or in a case where the driver for the general authentication application installed in the image formation apparatus in accordance with the instruction from the user is active.

7. The image formation apparatus according to claim 1, wherein, every time an instruction for switching an authentication application is issued in an authentication application management screen, one of the driver for the system authentication application and the driver for the general authentication application is stopped and the other driver is activated.

8. A control method for an image formation apparatus to which a reading apparatus that reads an IC card is connectable and which includes an authentication application that performs authentication of a user by acquiring authentication information stored in the IC card and read by the reading apparatus, the control method comprising:
   operating a driver that controls the reading apparatus; and
   displaying an authentication method setting screen that receives an instruction for setting one authentication method to be used for the image formation apparatus from among a plurality of authentication methods including at least a first authentication method using a keyboard and a second authentication method using the IC card, wherein, in a case where a driver for a system authentication application preinstalled in the image formation apparatus is active, the authentication method setting screen is displayed in the displaying, and wherein, in a case where the system authentication application is not active and a driver for a general authentication application installed in the image formation apparatus in accordance with an instruction from the user is active instead, the authentication method setting screen, in which a display form thereof is changed such that an instruction to set the second authentication method using the IC card by the system authentication application cannot be received as an authentication method to be used for the image formation apparatus, is displayed in the displaying.

9. A non-transitory computer-readable storage medium storing a program for causing an image formation apparatus to perform a process, the image formation apparatus to which a reading apparatus for reading an IC card is connectable and which includes an authentication application that performs authentication of a user by acquiring authentication information stored in the IC card and read by the reading apparatus, the process comprising:

operating a driver that controls the reading apparatus; and displaying an authentication method setting screen that receives an instruction for setting one authentication method to be used for the image formation apparatus from among a plurality of authentication methods including at least a first authentication method using a keyboard and a second authentication method using the IC card, wherein, in a case where a driver for a system authentication application preinstalled in the image formation apparatus is active, the authentication method setting screen is displayed in the displaying, and wherein, in a case where the system authentication application is not active and a driver for a general authentication application installed in the image formation apparatus in accordance with an instruction from the user is active instead, the authentication method setting screen, in which a display form thereof is changed such that an instruction to set the second authentication method using the IC card by the system authentication application cannot be received as an authentication method to be used for the image formation apparatus, is displayed in the displaying.

* * * * *